Aug. 5, 1958 — H. C. JENKINSON — 2,845,705
CAKE SERVING UTENSILS, AND THE LIKE
Filed April 9, 1957
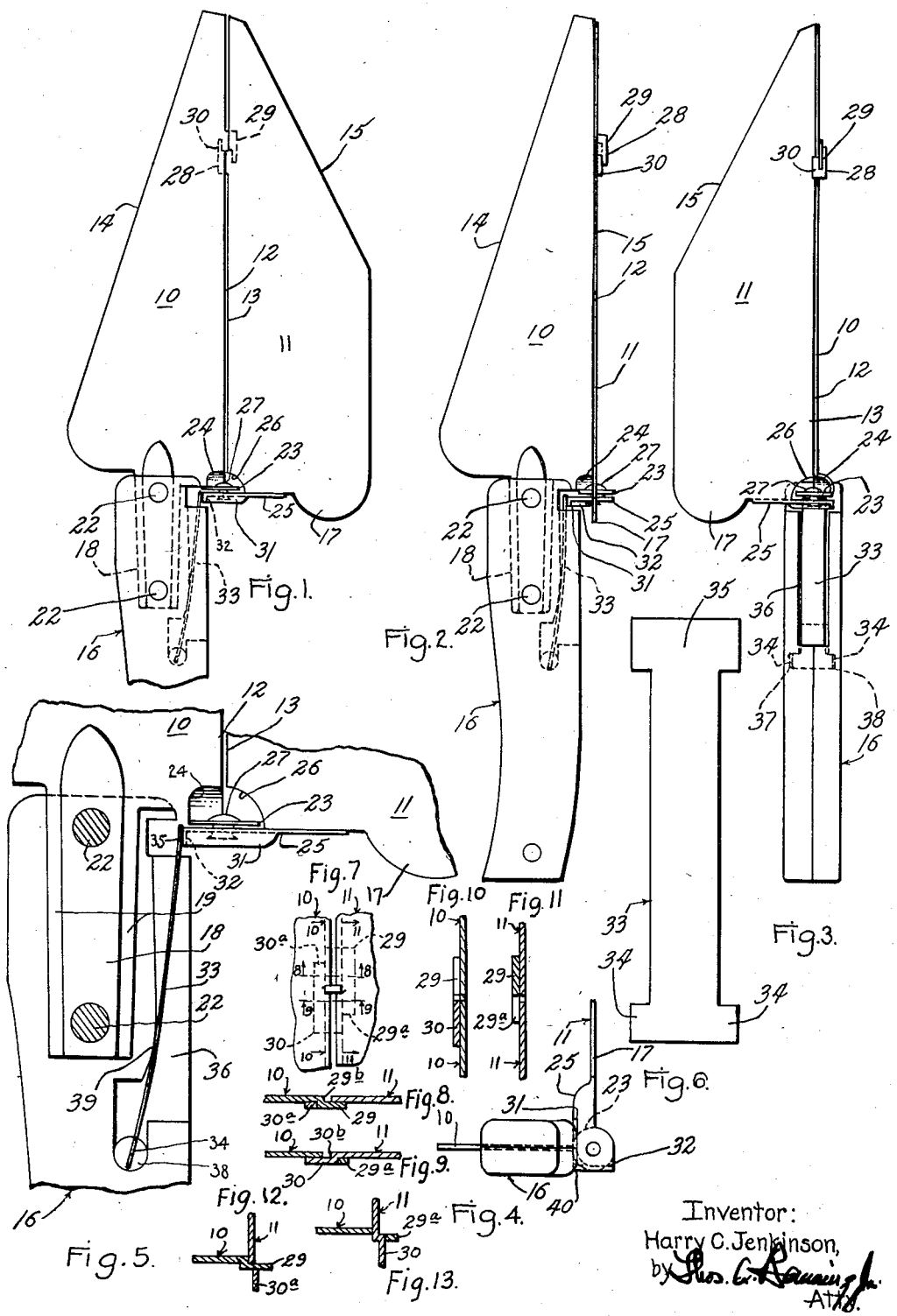
Inventor:
Harry C. Jenkinson,
by [signature]
Att'y.

United States Patent Office 2,845,705
Patented Aug. 5, 1958

2,845,705

CAKE SERVING UTENSILS AND THE LIKE

Harry C. Jenkinson, Chicago, Ill., assignor to Principal Mfg. Corp., Chicago, Ill., a corporation of Illinois Application April 9, 1957, Serial No. 651,631

9 Claims. (Cl. 30—122)

This invention relates to improvements in cake serving utensils, and the like. These utensils are designed and constructed in such manner that they may be conveniently used for first slicing the block of cake into the desired servings, after which the same utensil may be conveniently used for removing each slice from the platter or other dish whereon it is carried, and delivering such slice to the plate of the person being served. These operations may be readily and neatly performed by use of the utensil hereinafter illustrated and described by use of a single hand of the person doing the serving, thus leaving her other hand free for performing other operations incident to the serving process.

The utensils herein disclosed are also so formed that during the preliminary operation of cutting the block of cake into the desired segments a full area of smooth and substantially continuous surface is presented by the blades of the utensil so that danger of producing a rough and torn or ragged cut vertically through the cake block is avoided. In connection with the foregoing feature and object, however, the blades are so hinged directly together that after such slicing and cutting operation has been performed one of the blades may be readily rocked into right-angular position with respect to the other blade, thus producing a unit comprising a horizontal blade or shelf on which the slice can be taken and carried, together with a vertical plate at one side (generally the right side) of such shelf to retain the cake slice more certainly and positively in place on the horizontal blade. Thus too, when the blades have been brought into their intended right-angular relationship as during the serving operation, lateral deflection of the vertical blade is prevented, and vertical deflection of the horizontal blade is prevented. This result is attained due to the manner in which the blades are hinged together, as will appear hereinafter.

It is further feature and object of the invention to hinge the two blades together. Then by holding the device in intended and convenient maner by use of the single handle which is rigidly secured to one blade, generally the left blade, with such left blade in intended horizontal position, the other, hinged blade may be readily manipulated by a finger of the hand holding such handle, to rock such hinged right blade upwardly to bring it into the vertical position. This may be done while retaining the left blade to which the handle is connected in its intended horizontal position. Thus the utensil may be changed from a double blade planar condition to a double blade right-angular condition by the single hand which grasps such handle, leaving the other hand completely free to perform other operations. In this connection I have also provided a simple form of spring unit arrangement whereby such hinged blade will be spring retained in either its horizontal position or its vertical position with respect to the left blade to which the handle is connected. Such spring unit is of sufficient urge to enable the intended operations to be performed.

Other objects of the invention are to provide a very simple construction of utensil, one which can be readily produced by simple die cutting and forming operations, from sheet metal, with the exception of the handle which can be readily produced from moulded plastic or the like according to conventional practices and operations. It is a further object in this connection to so design and form the several parts that they can be readily and expeditiously assembled into the complete unit at low cost and consumption of time and labor.

Other objects and uses of the invention will appear from a detailed description of the same, which consists in the features of construction and combinations of parts hereinafter described and claimed.

In the drawings:

Figure 1 shows a plan view of a utensil embodying the features of my present invention, a portion of the handle being broken away to shorten the figure, both of the blades being rocked into planar relationship with respect to each other;

Figure 2 shows a view similar to that of Figure 1, but with the right-hand or hinged blade rocked on its hinge connection to the left hand or handle blade to bring the two blades into right-angular relationship with respect to each other;

Figure 3 shows a right-hand edge or face view corresponding to Figure 2 being a view at right angles to that of Figure 2;

Figure 4 shows an end view corresponding to Figure 2, and may also be considered as an end view corresponding to Figure 3;

Figure 5 shows on enlarged scale as compared to Figure 1 a fragmentary face view of the blade portions adjacent to the handle connection to the left-hand blade, the handle element being shown with its upper section removed to better reveal the leaf-spring accommodating socket, and to show the points of spring support by means of which the desired spring urge of the leaf spring is produced;

Figure 6 shows on enlarged scale as compared to Figure 5 a face view of the spring itself removed from the other elements;

Figure 7 shows on approximately double scale as compared to Figure 1 a fragmentary face view of the blades 10 and 11 at and adjacent to the location of the hinge element 28;

Figures 8 and 9 show fragmentary cross-sections on the lines 8—8 and 9—9 of Figure 7, looking in the directions of the arrows; and these figures show how the hinge lugs interlock with the blades opposite to them to limit the rocking of the right-hand blade at the position in which the blades are in planar alignment with each other;

Figures 10 and 11 show fragmentary longitudinal sections on the lines 10—10 and 11—11 of Figure 7, looking in the directions of the arrows; and Figures 12 and 13 show fragmentary cross-sections on the lines 8—8 and 9—9, respectively, of Figure 7, but with the right-hand blade rocked into position at right angles to the left-hand blade; and these figures show how the hinge lugs interlock with the blades opposite to them or with the lugs of such blades, to limit the rocking of the right-hand blade at the position in which the blades are at right-angles to each other.

In the figures the left-hand blade which may for convenience be called the horizontal blade, is shown at 10 and the right-hand or hinged blade is shown at 11. These blades are formed from suitable sheet stock, generally but not necessarily, by die cutting and forming operations, as it is also evident that they might be formed of moulded plastic of acceptable composition and proper treatment. These two blades are hinged directly together along their proximate edges 12 and 13, respectively. Such direct hinging may be effected in any convenient manner and by any suitable form of hinge. It is, however desirable that such hinging be effected by a construction which does not include elements departing substantially from the top and bottom faces of the blades—that is, a construction in which a substantially uniform and non-obstructed surface is presented at both faces of both blades. This uniformity of surface is desirable so as to ensure smooth riding of the left-hand or cutting blade, 10, through the cake or other edible material, during the cutting operation, and also to avoid needless tearing or roughening of the cut surface of the body of the cake and the severed slice during the cutting operations. These operations will be better understood from the following statement: The two blades 10 and 11 are brought into the planar relationship shown in Fig. 1, such operation being possible due to the hinging of the two blades together as already explained. Then, by grasping the handle 16, presently to be described, and so holding the utensil that the blades are vertical, they may be cut down through the cake block to sever the slice. It is also noted that preferably the edge 14 of such blade 10, opposite to the hinged connection presently to be described, is slanted or tapered with respect to the axis of hinge, such construction being desirable as facilitating the use of the implement in normal manner of usage. Such edge 14 may be either straight as shown, or serrated, or corrugated, or saw-toothed, or other form, as desired. The thicknesses of the blades should also be such as to provide desired stiffness, but without impairment of the cutting action during use. The blade 11 is also shown as being provided with a slanting outer edge portion 15, but of less extent along the length of the blade than such slanting edge 14 of the blade 10.

A handle, designated in its entirety by the numeral 16, is rigidly connected to the left-hand blade 10. This handle is of form such that it may be conveniently grasped by the hand, preferably the right hand of the user, under which operation the blade 10 may be readily turned to present its cutting edge 14 downward to the cake block. With the two blades in planar alignment the cutting operation may then be carried through to completion, even though the depth of the cake block be greater than the width of such blade 10, since the companion blade 11 lies in planar alignment with such blade 10, and since the hinged connection between the two blades, produces substantially no impairment of the overall surface and continuity of such surface, presented to the cake block.

Having effected the cutting operation the utensil is withdrawn from the cake block, and, if an adjacent cut has been previously made, the slice is to be removed. For this purpose the blade 11 is now rocked with respect to the blade 10 on the hinged connection, so as to bring both blades into right-angular relationship, as shown in Figures 2, 3 and 4. Then by holding the handle in such manner that the blade 10 is horizontal and the blade 11 extending vertically from the right-hand edge of the blade 10, the blade 10 can be slipped endwise beneath the cut-off slice, the blade 11 at the same time moving into facial engagement with the right-hand face of the slice. Thus the slice can be taken onto the blade 10, raised up by such blade by proper manipulation of the handle, and, while retaining the blade 10 horizontal, such slice can be removed, the blade 11 giving lateral support and protection against shift of the slice rightwardly from the blade 10. Or, as will frequently be the case, the user will actually rotate the handle clockwise somewhat thus causing the slice to come against such blade 11, the slice then being supported within the V-shaped recess thus produced between the two blades which are still at right-angles to each other. After completing such an operation it will be desired to rock the blade 11 back into planar alignment with the blade 10 prior to the next cutting operation. To effect the rocking of the blade 11 back and forth with respect to the blade 10 I have provided the rearwardly projecting enlargement 17 on the blade 11. It is now noted that when grasping the handle in the palm of the right hand, using the fingers to effect such grasp, and the palm of the hand facing upward against the handle, it is convenient to use the thumb of such grasping hand to press against such projection 17 to produce rocking of the blade 11 in either direction, the handle and blade 10 remaining firmly grasped by the hand and not changing position during such rocking of the blade 11. Such projection 17 comprises a portion of the flat blank from which the blade 11 is formed, and extends smoothly back from the body of the blade 11, so that such projection does not present any obstacle to smooth movement of cake material rearwardly past such projection, should such movement be desired. Furthermore, such projection does not interfere with convenient washing or cleaning of the blade after the operations have been completed.

The blade 10 is formed with a rearwardly projecting extension 18, preferably reinforced by longitudinally extending ribs 19 formed in the sheet stock during the operation of forming such blade 10. The handle 16 is conveniently formed of a pair of plastic or other suitable material sections 20 and 21, which when set and secured together provide a properly shaped and smooth hand grip. The proximate faces of these sections are formed with recesses of proper form and depth to receive the blade extension 18 in firm manner when the two handle sections are secured together. The two handle sections are then secured together by screws or small bolts 22, one or more of which preferably also extend through the blade extension as shown. It is thus apparent that the blade 10 and the handle 16 comprise a rigid unit of the utensil.

The two blades are hinged together in the following manner: The rear edge of the blade 10 is formed with an upwardly extending ear 23 at its corner proximate to the blade 11. Such ear comprises a lug portion of the blank from which the blade 10 is formed. Said ear is produced as follows: The blank from which the blade 10 is formed is provided with a lug extending towards the observer (when viewing the blank or blade as in Fig. 1), from the corner of such blank. The blank is then depressed so as to produce a depression of the blank at such corner, the limit of such depression being shown by the line 24 in Figs. 1, 2, 3 and 5. Thus the floor of such depression is set to a surface below the surface of the blade 10 by an amount sufficient to accommodate the semi-diameter of the pivot rivet 27 presently referred to. At the same time the lug 23 already referred to is formed upwardly at right angles to the floor of such depressed portion and therefore normal to the plane of the blade 10. This forming operation results in production of the ear 23 lying in a plane normal to the plane of the blade 10 and extending up from the floor of the depression to an elevation above the plane of the blade. Thus the rivet 27 may be set through the ear with the shank of such rivet in line with the edge 12 of the blade 10. Correspondingly, the left-hand corner portion of the blade 11 is provided with a lug 25 to co-operate with such lug 23 for producing the desired pivotal connection by use of the rivet 27. Such lug 25 comprises an extension from the lower left-hand corner of the blade 11. Such extension also includes metal of the blank from which the blade 11 is made, as defined by the line 26 along which the lug is partially severed from the blank. The shape of the body of such lug 25 is shown in Fig. 4 (in which figure the blade 11 has been turned into right-angular relation to the blade 10). Such lug is there shown as bent at right-angles to the blade 11. Having done this the metal defined by the cut line 26 will extend below the surface of the blade 11 a distance to accommodate the shank of the pivot rivet 27. Such lug 25 as thus formed overlies the ear 23 proximate to the back face of such ear; and a pivot pin such as the small rivet 27 is then extended through both the ear and the lug to provide the desired pivotal connection between these parts. Such pivotal connection is substantially in alignment with the edge 12 of the blade 10, as shown in Figs. 1, 2, 3, 4 and 5. Such rivet, when used as the pivotal element, is of course headed in such manner as to allow the necessary freedom of rocking to occur between the ear and the lug. In fact, a slight clearance between such ear and lug is shown in various of the figures. The lug 25 is also so formed as to provide for certain functions to be explained hereinafter.

Thus I have provided the desired hinged connection between the proximate rear portions of the two blades. By the term "rear" I mean those blade portions closest to the observer in Figs. 1, 2, 3 and 5. However, in case of the provision of only the pivot element 27 and in the absence of a further hinging provision the two blades would tend to deflect bodily with respect to each other at the location of such pivot pin. Also, due to their lengths and natural flexibility the blades would not retain accurate planar alignment of their surfaces and above all their proximate edges would in all probability be twisted with respect to each other and cease to align accurately the one with the other. To meet this condition and provide against it I have made the following further hinging provision:

The proximate edge portions of the two blades are hingedly connected together at 28 at a location close enough to the rear ends of the blades to retain said edges substantially parallel to each other at all times. As shown in various of the figures such further hinging is provided at substantially three-fourths of the way back of the blades, measured from the pivot element 27 to the rear ends of the blades. Thus enough stiffness is produced, to prevent any appreciable deflection of one blade with respect to the other, due to any loading to which such blades may be subjected. Thus too, the hinged connection at the pin 27 is not subjected to twisting or binding due to the loading of the blade 10 or the blade 11 or both such blades. Such hinging connection 28 may be of any convenient form, but preferably a form such as to not include parts departing materially from the body surfaces of the two blades. The hinge thus provided is shown in enlarged detail in Figures 7, 8, 9, 10 and 11, for the condition that the blades 10 and 11 are in planar alignment, and in Figures 12 and 13 for the condition that the blades are at right-angles to each other. Such hinge includes the two intermatched lugs 29 and 30, formed out from the proximate edges of the two blades 10 and 11, respectively, and, as shown in Figures 2 and 3 and Figures 7 to 13, inclusive, such lugs are also depressed below the lower surfaces of their respective blades. The hooks of these two lugs face in opposite directions endwise of the utensil, so that the assembling operation to bring them into co-operative engagement includes a slight amount of endwise shift of the one blade with respect to the other. This shift also brings the ear 23 and lug 25 into desired relation, so that then, by inserting the pivot element 27, which prevents reverse shift from occurring, the two blades and their hinge lugs are locked against disengagement except by an intentional destroying operation.

Examination of Figures 2 and 3 and Figures 8, 9, 10 and 11 shows clearly that such supplemental hinge connection as thus illustrated and described presents no material impairment of the flat surfaces of the two blades, and that such slight impairment as is produced by them amounts only to the thickness of the blade material plus small clearances needed for freedom of hinging. It is further noted that when the two blades are brought into planar alignment as shown in Figures 1, 7, 8, 9, 10 and 11 the top surfaces of both blades lie in the same true plane, and that there is no impairment of such planar surfaces of the tops of the blades, the cake slice being supported by such top surfaces. All of such impairment lies below the blades where it is of minor effect as far as the operation of the utensil is concerned, and as far as affects the neatness of the cutting and serving operations produced.

It is also here noted that the hinging arrangement shown at 28 serves a further important function as follows:

It is desired to provide stops to limit the hinging to either the planar alignment or the right-angled relation of the blades with respect to each other. Examination of the working of the two interlocked lugs shown in the figures will reveal that said lugs so act upon each other and upon the proximate edge portions of the companion blades as to produce such desired limitation of rocking movement between the blades in either direction of rocking. These limitations of rocking movement are produced as follows: When the two blades have come into planar alignment the two lugs 30 and 29 of the blades 11 and 10, respectively, have come into facial engagement with the undersurfaces of the opposite blades so that further rocking beyond such planar condition cannot occur without bending the lugs. Contrarily, when the two blades have been rocked into right angular relation the two lugs have come together, being then away from the blade surfaces, so that blade rocking beyond such right-angular relationship is prohibited by the interengagement of the two lugs. Thus I have also provided for definitely stopping the relative rocking of the two blades with respect to each other by stopping means located relatively close to their rear ends. I have also provided means to stop such rocking at locations close to the pivot pin 27 in the form of the spring means now to be described. Reference is now made to Figures 1 to 5 as showing the details of such spring means, as follows:

The lug element 25 has its top edge portion bent rearwardly to present the narrow surface or flange 31 (see Figure 5 in particular), and the end of such lug element 25 has its end edge portion bent rearwardly to present the companion narrow surface or flange 32 (see Figure 4 in particular). These two flange surfaces lie at right angles to each other, corresponding thus either to the right-angle relation of the blades to each other, or to the planar alignment relation of such blades to each other, respectively. The two handle sections are provided with a socket wherein is received and retained a leaf spring, with the front end of such leaf anchored to the handle, and with the rear end of such leaf normally biased to spring rightwardly but deflectable leftwardly under force of the right angle between the flange surfaces 31 or 32, as the case may be. This leaf spring 33 is shown on large scale in Figure 6, wherein it is seen to comprise a piece of flat spring stock, provided with the oppositely extending end lugs 34 at its front end, and with the rear end of such leaf preferably widened as shown at 35 to provide an enlarged surface to ride on the angle between the flange surfaces or on the one or the other flange surface 31 or 32 as the case may be during rocking of the two blades with respect to each other. The handle socket includes the lengthwise extending recess 36 (see Figures 3 and 5) of dimension normal to the general plane of the handle (being also normal to the plane of the blade 10) sufficient to receive the body portion of the leaf spring. The front end of this handle recess is provided with upper and lower sockets 37 and 38 to receive the lugs 34 of the front end of the leaf spring, thus anchoring such front end against lateral shift. The floor of such socket or recess 36 is so formed as to provide a bearing or pivot point 39 against which the body of the leaf spring bears as the rear end of such leaf is forced leftwardly. The sockets 37 and 38 are so located with respect to such bearing point 39 that with the leaf in its normal planar form its rear end would lie rightwardly of either of the flange surfaces 31 or 32. Accordingly, when the two blades are assembled into the handle sections (such two blades having been first pivotally connected together, including the pivot 27), it is necessary to force the rear end of the leaf spring leftwardly to assemble the projection 18 of the blade 10 into the handle sections, thus producing a pre-loading condition of the spring. This will be true whether the blade assembly (the two blades pivoted together) is in its planar condition or its blade right-angular condition. Having then assembled such blade projection or extension 18 into the two handle sections, and secured such handle sections together as by the screws or bolts 22, it will be seen that the bias urge of the leaf spring will exert a rightward force against the flange surface 31 or the flange surface 32 as the case may be, thus holding the hinged blade 11 firmly in the one position or the other. Nevertheless, by forcing such blade 11 in the proper direction of hinging, the corner 40 where the two flange surfaces come together will be forced against the rear end portion of the spring, deflecting such rear end portion leftwardly until the dead-center position of engagement is passed. Thereupon the spring will act to continue such blade rocking to its completion of movement as limited or stopped in the manner already described, by the hinge lugs 29 and 30.

It is now seen that by pressing against the lug 17 by use of the thumb of the hand grasping the handle, the blade 11 may be forced slightly more than 45 degrees in the desired direction, thus shifting the corner 40 of the flange surfaces beyond the dead-center position, whereupon the spring will act to complete the rocking movement of such blade 11, and will retain such blade firmly in its so-rocked position until a reverse operation is purposely produced. A contrary movement of the blade 11 may also be produced by proper pressure against such lug 17 produced by the user's thumb.

It is here pointed out that since the blade 10 is rigidly secured to the handle, and since the blade 11 is thus pivotally connected to such blade 10, and since the urging spring force is developed between the handle and such blade 11 it follows that the rocking of such blade 11 in either direction occurs without any corresponding movement of the handle and the blade 10, so that the person using the utensil may hold the handle firmly stationary during such rocking of the blade 11 in either direction. This is not true of any arrangement wherein the handle is split into two sections, hinged together, and both of which are grasped at the same time by the hand of the user.

In reference to the hinging of the two blades directly together, independently of the provision of a two part handle with such two parts hinged together, it is noted that when using the utensil with such blades at right-angles to each other, as during a serving operation after the slice has been cut, such direct hinging of the blades together provides added rigidity to the handle connected blade whereon the slice is received and carried. This is especially true when such direct hinging together of the blades includes hinge elements located well to the rear of the device, as are the hinge elements 29 and 30 of the presently disclosed unit. Any tendency of the horizontal blade to deflect downwardly due to its supported load is resisted by the direct support produced by such hinge elements, and such added support is provided at the location where it is most advantageous. Of course, when the blade 11 is in its then vertical position it is able to provide many times the stiffness against any downward deflection than is provided when the two blades are in planar alignment, as is well understood in the structural arts.

A comparison of Figures 7 to 13, inclusive, clearly shows the manner in which the hinge unit 29 not only serves the purpose of hinging the two blades 10 and 11 together but also limits the amount of rock of the blade 11 with respect to the blade 10. Thus, when rocking the blade 11 towards the planar aligned position such rocking is limited at such planar aligned position by engagement of the lug 30 of the blade 11 with the undersurface of the blade 10 (see Figs. 8 and 9), and by engagement of the undersurface of the blade 11 with the lug 29 of the blade 10. Also, when rocking the blade 11 towards the right-angular limited position such rocking is limited by engagement of the lug 30 of the blade 11 with the lug 29 of the blade 10 (see Figs. 12 and 13), and by engagement of the left-hand edge portion of the top surface of the blade 11 with the edge 12 of the blade 10 (see Fig. 12).

These lugs also prevent disengagement of the edge 13 of the blade 11 rightwardly from the edge 12 of the blade 10. This function is produced when the blade 11 has been shifted forwardly with respect to the blade 10 to bring the lug 25 of the blade 11 close to the face of the ear 23 of the blade 10 so that the pivot rivet 27 can be loosely riveted in place as shown in Fig. 5. Such slight forward shift is produced during the assembling operation. It serves to shift the left-hand prong 30$^a$ of the lug 30 forward into lateral alignment with the offset portion 29$^b$ of the lug 29 (see Fig. 8), and also serves to shift the offset portion 30$^b$ of the lug 30 into lateral alignment with the prong 29$^a$ of the lug 29 (see Fig. 9). Then, when the pivot rivet has been headed to complete the assembling operation these parts cannot become disengaged without shifting the blade 11 backward (towards the observer in Figs. 1 and 5). Such backward shift is prevented by the pivot rivet 27.

I claim:

1. As a new article of manufacture, a cutting and serving utensil comprising first and second thin substantially flat blades each having at least one straight edge, said blades being located with their said straight edges in juxtaposition and with their ends in a common plane normal to said straight edges, a handle element secured to such end of the first blade and extending from said end of said blade, first interengaging hinge elements connected to said ends of the two blades and overlapping each other with the straight edges of the blades parallel to and in close proximity to each other, a first pivotal connection between said first interengaging hinge elements and having its pivotal axis parallel to and substantially coincident with the proximate edges of the two blades, said pivotal connection being constituted for rocking movement of the second blade with respect to the first blade between a position of substantial planar alignment of the two blades with respect to each other and a position of the second blade at substantially right-angles to the first blade, together with second interengaging hinge elements on the said edges of the two blades and located at positions along said edges substantially at least one-half of the length of the said edges from the first interengaging hinge elements, said second interengaging hinge elements including a pivotal connection between them substantially in alignment with said first interengaging hinge elements.

2. An article as defined in claim 1, wherein the second interengaging hinge elements include stop elements constituted for stopping engagement with each other at the position of planar alignment and at the position of substantial right-angularity of the blades with respect to each other.

3. An article as defined in claim 1, wherein the first interengaging hinge elements comprise an ear connected to the end of the first blade and a lug connected to the end of the second blade, both said ear and said lug extending through the pivotal axis and overlapping each other at the location of said axis, and wherein the first pivotal connection comprises a stud extending through the ear and through the lug.

4. An article as defined in claim 1, wherein the second interengaging hinge elements comprise companion hook shaped lugs connected to the proximate edges of the two blades at locations in opposition to each other, each lug being offset from the plane of the blade to which it is connected and including a prong element parallel to the edge of such blade and connected to such blade by a shank, and the prong elements of the two blades extending in opposite directions, the prong of each lug engaging the shank of the opposite lug when the blades are in juxtaposition with each other and with the first interengaging hinge elements in overlapping relation and with the first pivotal connection in position between said first interengaging hinge elements.

5. An article as defined in claim 4, wherein the first interengaging hinge elements comprise an ear connected to the end of the first blade and a lug connected to the end of the second blade, both said ear and said lug extending through the pivotal axis and overlapping each other at the location of said axis, and wherein the first pivotal connection comprises a stud extending through the ear and through the lug.

6. As a new article of manufacture, a cutting and serving utensil comprising first and second thin substantially flat blades each having at least one straight edge, said blades being located with their said straight edges in juxtaposition and with their ends in a common plane normal to said straight edges, a handle element secured to such end of the first blade and extending from said end of said blade, first interengaging hinge elements connected to said ends of the two blades and overlapping each other with the straight edges of the blades parallel to and in close proximity to each other, a first pivotal connection between said first interengaging hinge elements and having its pivotal axis parallel to and substantially coincident with the proximate edges of the two blades, said pivotal connection being constituted for rocking movement of the second blade with respect to the first blade between a position of substantial planar alignment of the two blades with respect to each other and a position of the second blade at substantially right-angles to the first blade, second interengaging hinge elements on said edges of the two blades and located at positions along said edges away from the first pivotal connection, said second interengaging hinge elements including a pivotal connection between them substantially in alignment with said first interengaging hinge elements, together with spring force means having one end in force connection with the first blade and its other end in force connection with the second blade, the force connection of said other end of the spring force means to the second blade being constituted to exert a spring force urging the second blade to remain in said position of substantial planar alignment of the two blades when the second blade is in said planar alignment position, and being constituted to exert a spring force urging the second blade to remain in said position of right-angularity of the two blades when the second blade is in said right-angularity position.

7. An article as defined in claim 6, wherein the spring force means comprises a leaf spring.

8. An article as defined in claim 7, wherein one end of said leaf spring is connected to a part rigid with respect to the first blade and wherein the other end of said leaf spring produces a force in direction to substantially intersect the pivotal axis of the first pivotal connection, and wherein the point of force connection of such other end of said leaf spring to the second blade lies at one side of said pivotal axis when the blades are in planar alignment and lies at the other side of said pivotal axis when the blades are in said right-angular relationship.

9. An article as defined in claim 8, wherein the part rigid with respect to the first blade is the handle, and wherein the points of force connection to the second blade which lie at one side of the pivotal axis when the blades are in planar alignment and at the other side of said pivotal axis when the blades are in right-angular relationship comprise surfaces of an element in connection with the second blade, which surfaces are engaged by the leaf spring when the second blade is in the planar alignment position or the right-angular position, respectively.

References Cited in the file of this patent

UNITED STATES PATENTS 2,502,982     Norman _____ Apr. 4, 1950